United States Patent
Zhou et al.

(10) Patent No.: US 11,902,430 B2
(45) Date of Patent: Feb. 13, 2024

(54) QUANTUM COLOR IMAGE ENCRYPTING METHOD AND CIRCUIT BASED ON MODIFICATION DIRECTION

(71) Applicant: Shanghai Maritime University, Shanghai (CN)

(72) Inventors: Rigui Zhou, Shanghai (CN); Wenwen Hu, Shanghai (CN); Ping Fan, Shanghai (CN); Rirong Zhou, Shanghai (CN); Ganbin Wang, Shanghai (CN)

(73) Assignee: Shanghai Maritime University, Shanghai (CN)

( * ) Notice: Subject to any disclaimer, the term of this patent is extended or adjusted under 35 U.S.C. 154(b) by 392 days.

(21) Appl. No.: 17/260,286

(22) PCT Filed: May 21, 2020

(86) PCT No.: PCT/CN2020/091470
§ 371 (c)(1),
(2) Date: Jan. 14, 2021

(87) PCT Pub. No.: WO2021/036361
PCT Pub. Date: Mar. 4, 2021

(65) Prior Publication Data
US 2022/0141007 A1    May 5, 2022

(30) Foreign Application Priority Data
Aug. 23, 2019 (CN) .......................... 201910784180.X (51) Int. Cl.
*H04L 9/08* (2006.01)
*G06N 10/80* (2022.01)
(Continued)

(52) U.S. Cl.
CPC ............ *H04L 9/0852* (2013.01); *G06N 10/80* (2022.01); *H04N 1/4486* (2013.01); *H04N 1/46* (2013.01)

(58) Field of Classification Search
CPC ...... H04L 9/0852; G06N 10/80; G06N 10/20; H04N 1/4486; H04N 1/46; H04N 1/32208; H04N 1/32309; H04N 1/44
See application file for complete search history.

(56) References Cited

U.S. PATENT DOCUMENTS

| | | | |
|---|---|---|---|
| 8,538,066 B2* | 9/2013 | Petrovic ................ | G06T 1/0028 380/201 |
| 11,361,397 B2* | 6/2022 | Zheng ................... | G06T 1/0042 |

(Continued)

*Primary Examiner* — Baotran N To
(74) *Attorney, Agent, or Firm* — Amster, Rothstein & Ebenstein LLP (57) ABSTRACT

Disclosed are a quantum color image encrypting method based on modification direction and corresponding circuit, respectively providing quantum modular circuits design for a parallel adder, a parallel subtractor, a comparator, a cyclic shift add 1, and a cyclic shift subtract 1; and based on these modular circuits, circuit for implementing quantum color image steganography is provided. From the complexity analysis of implementing quantum circuit for color image steganography, it is seen that for a two-dimensional quantum color image with $2^{2n}$ pixels and the R, G, and B channels of which are respectively represented by q number of quantum bits, the steganography algorithm is an efficient transformation method, and the circuit complexity is $O(q^2+n)$, which can hardly be achieved by classical geometric transformation. The disclosure is applicable for many practical image processing applications, e.g., transmitting secrete data via a public image; they all need an effective and secure steganography algorithm; besides, the present disclosure is significant in perfection and applications of image processing theories.

10 Claims, 10 Drawing Sheets

(51) Int. Cl.
*H04N 1/44* (2006.01)
*H04N 1/46* (2006.01)

(56) References Cited

U.S. PATENT DOCUMENTS

| | | | | |
|---|---|---|---|---|
| 2013/0259294 | A1* | 10/2013 | Mehta | G06T 1/0028 |
| | | | | 382/100 |
| 2017/0155916 | A1* | 6/2017 | Das | H04N 19/467 |
| 2018/0091871 | A1* | 3/2018 | Nakagata | G06T 1/0085 |
| 2018/0232844 | A1* | 8/2018 | Cai | H04N 1/3232 |
| 2021/0407034 | A1* | 12/2021 | Zheng | G06T 1/0071 |

\* cited by examiner

QUANTUM COLOR IMAGE ENCRYPTING METHOD AND CIRCUIT BASED ON MODIFICATION DIRECTION

CROSS-REFERENCE TO RELATED APPLICATIONS

This application is a U.S. national stage entry under 35 U.S.C. § 371 of PCT International Patent Application No. PCT/CN2020/091470, filed May 21, 2020, which claims priority to Chinese Patent Application No. CN201910784180.X, filed Aug. 23, 2019, the contents of each of which are incorporated herein by reference in their entirety.

FIELD

Embodiments of the present disclosure relate to a quantum image processing technology, and more particularly relate to a quantum color image encrypting method and corresponding circuit based on modification direction.

BACKGROUND

Quantum computers have several different structural models, such as quantum Turing machine (QTM) models, quantum circuit models, and cellular automata models, etc. As the quantum circuit models have equivalent functions to the other models but are more readily comprehensible, a quantum computer is defined using such quantum circuit models as being built by a quantum circuit formed by arrangement of connection lines and basic quantum gates so as to process quantum information. In the quantum computer, the basic unit for information storage and processing is quantum bit (qubit). Thanks to the unique advantages of quantum mechanics such as superposition, entanglement and coherence, the quantum computer can store the data in superposition states, and then process the data in parallel, which makes it tackles some math problems that are challenging for classical computers such as prime factorization of big numbers, resolution of discrete logarithms, and acceleration of searching from a database.

Therefore, quantum computing and quantum information processing have become the focuses of strategic competition among the countries throughout the world. For example, the Military Balance 2019 released by the International Institute for Strategic Studies (IISS) on Feb. 15, 2019 set out the main applications of quantum technologies in the national defense sector, development status quo of quantum technologies in major countries, and the supremacy of quantum technologies in the computer industry (particularly in the geopolitics), and concluded that the quantum technologies would generate a profound influence on national defense building and development for the countries.

The interdisciplinary extended from the combination of quantum computing and digital image processing technologies is defined as quantum image processing. The quantum image processing is mainly divided into two aspects: quantum image representation and quantum image processing algorithm.

In classical computing, the information unit is represented by bit, which only has two states: 0-state or 1-state. In quantum computing, the information unit is represented by qubit, which has two basis states $|0\rangle$ and $|1\rangle$, called as computational basis states. Different to single classical single bit can only be in state of 0 or 1, Single qubit may be a linear combination of two basis states, referred to as a superposition state represented by $|\psi\rangle = a|0\rangle - b|1\rangle$, where a and b are two complex numbers, indicating the values of corresponding quantum amplitudes, which satisfy $|a|^2 + |b|^2 = 1$ and are thus referred to as probability amplitudes. That is, when measuring the qubit, the quantum state $|\psi\rangle$ would be collapsed into state $|0\rangle$ with a probability of $|a|^2$, or collapsed into state $|1\rangle$ with a probability of $|b|^2$. Therefore, one qubit may contain two states of $|0\rangle$ and $|1\rangle$ simultaneously: which is totally different from the bit in classical computing.

Tensor Product is a way of merging smaller vector spaces to form a vector space with a larger dimensionality, represented by sign $\otimes$. The tensor product has the following meanings:

assuming that U and V are two complex matrices:

$$U = \begin{bmatrix} u_{00} & u_{01} \\ u_{10} & u_{11} \end{bmatrix}, V = \begin{bmatrix} v_{00} & v_{01} \\ v_{10} & v_{11} \end{bmatrix}$$

then:

$$U \otimes V = \begin{bmatrix} u_{00}v_{00} & u_{00}v_{01} & u_{01}v_{00} & u_{01}v_{01} \\ u_{00}v_{10} & u_{00}v_{11} & u_{01}v_{10} & u_{01}v_{11} \\ u_{10}v_{00} & u_{10}v_{01} & u_{11}v_{00} & u_{11}v_{01} \\ u_{10}v_{10} & u_{10}v_{11} & u_{11}v_{10} & u_{11}v_{11} \end{bmatrix}$$

For two quantum basis states $|u\rangle$ and $|v\rangle$, the tensor product $|u\rangle \otimes |v\rangle$ is often represented by the abbreviated symbol $|uv\rangle$, $|u\rangle|v\rangle$ or $|u,v\rangle$; for example, for single-qubit basis states $|1\rangle$ and $|0\rangle$, their tensor product is expressed as:

$$|1\rangle \otimes |0\rangle = |1\rangle|0\rangle = |10\rangle = \begin{bmatrix} 0 \\ 1 \end{bmatrix} \otimes \begin{bmatrix} 1 \\ 0 \end{bmatrix} = \begin{bmatrix} 0 \\ 0 \\ 1 \\ 0 \end{bmatrix}$$

The n-order tensor product $|u\rangle \otimes |u\rangle \otimes \ldots \otimes |u\rangle$ of the quantum state $|u\rangle$ can be expressed as $|u\rangle^{\otimes n}$.

A two-qubit may be synthesized by tensor operation on two single-qubits, which has four basis states $|00\rangle$, $|01\rangle$, $|10\rangle$ and $|11\rangle$. Therefore, a two-qubit state can be described as:

$$|\psi\rangle = a_{00}|00\rangle + a_{01}|01\rangle + a_{10}|10\rangle + a_{11}|11\rangle$$

where the occurrence probabilities of measurement results $|00\rangle$, $|01\rangle$, $|10\rangle$ and $|11\rangle$ are $|a_{00}|^2$, $|a_{01}|^2$, $|a_{10}|^2$ and $|a_{11}|^2$, which satisfy that the sum of probability amplitudes is 1, namely, $|a_{00}|^2 + |a_{01}|^2 + |a_{10}|^2 + |a_{11}|^2 = 1$.

If a quantum system comprises n qubits, then the quantum system has $2^n$ mutually orthogonal basis states $|i_{n-1}i_{n-2} \ldots i_0\rangle$, $i_0, i_1, \ldots, i_{n-1} \in \{0,1\}$. The state can be expressed as:

$$|\psi\rangle = \sum_{i=0}^{2^n-1} a_i |i\rangle$$

where $i = i_{n-1}i_{n-2} \ldots i_0$ is the binary expansion of the integer i and satisfies the normalization condition $$\sum_{i=0}^{2^n-1} |a_i|^2 = 1.$$

If a quantum circuit formed by a set of quantum logic gates can approximate to any unitary transform at any precision, then this set of quantum gates are universal. Single-qubit gates and Controlled-NOT gates are important universal gates, which mean a general quantum logic gate can be decomposed into a series of single-qubit gate and Controlled-NOT gate.

Figure 1:
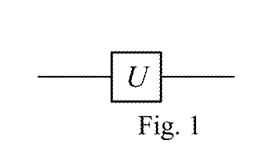
FIG. 1 is a symbol representation of a single-qubit U gate in the prior art.
Figure 2:
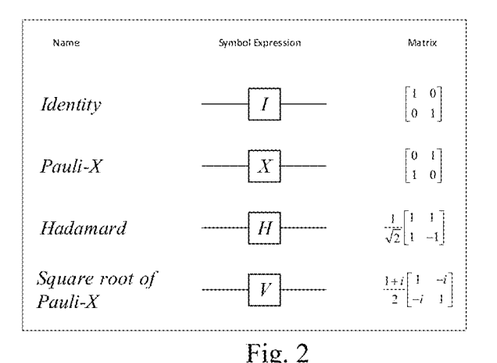
FIG. 2 is a typical single-qubit gate in the prior art.

A qubit gate may be conveniently represented by unitary matrix, while a single-qubit gate may be represented by a 2×2 unitary matrix U, i.e., $U^\dagger U = I$, where $U^\dagger$ is the conjugate transpose matrix of U, and I is an identity matrix. The single-qubit gate representation is shown in FIG. 1, where U is a 2×2 unitary matrix. By replacing the U matrix in FIG. 1 with a specific matrix, a symbol representation of a specific single-qubit gate can be obtained. FIG. 2 shows the names, symbols, and corresponding matrices of several common single-qubit gates.

In a two-qubit gate, the Controlled-U gate is the most important, where U refers to any 2×2 unitary matrix. The two-qubit gate has two input qubits, which are respectively called as control qubit and target qubit. When the control qubit is in a control quantum state, the U operation will be applied to the target qubit; otherwise, the target qubit does not change. The control qubit may be in a $|0\rangle$ state or $|1\rangle$ state. The symbols and corresponding matrix representations of control qubits are shown in FIG. 3, wherein the white dots and the black dots represent that the states of the control qubits are computational basis states $|0\rangle$ and $|1\rangle$, respectively.

Figure 3:
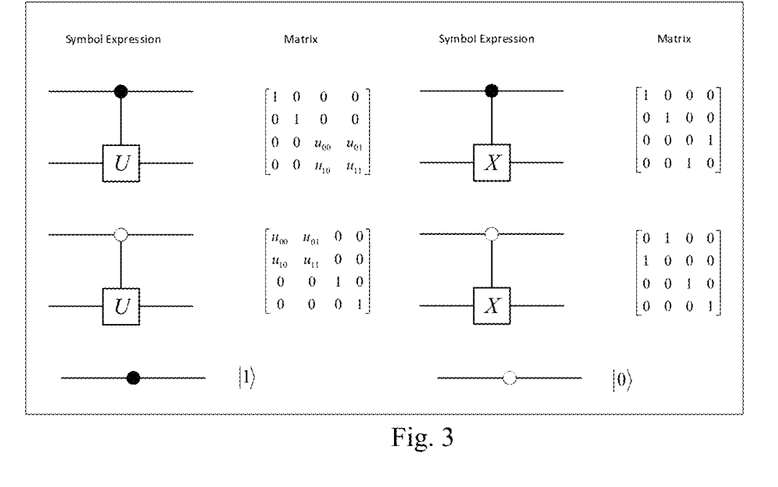
FIG. 3 is a two-qubit Controlled-U gate and a two-qubit Controlled-X gate in the prior art.

If the U matrix in the two-qubit Controlled-U gate is the X gate in FIG. 2, then the two special controlled U gates are referred to as the Controlled-NOT gate, the symbols and corresponding matrix representations of which are shown in FIG. 3.

Figure 4:
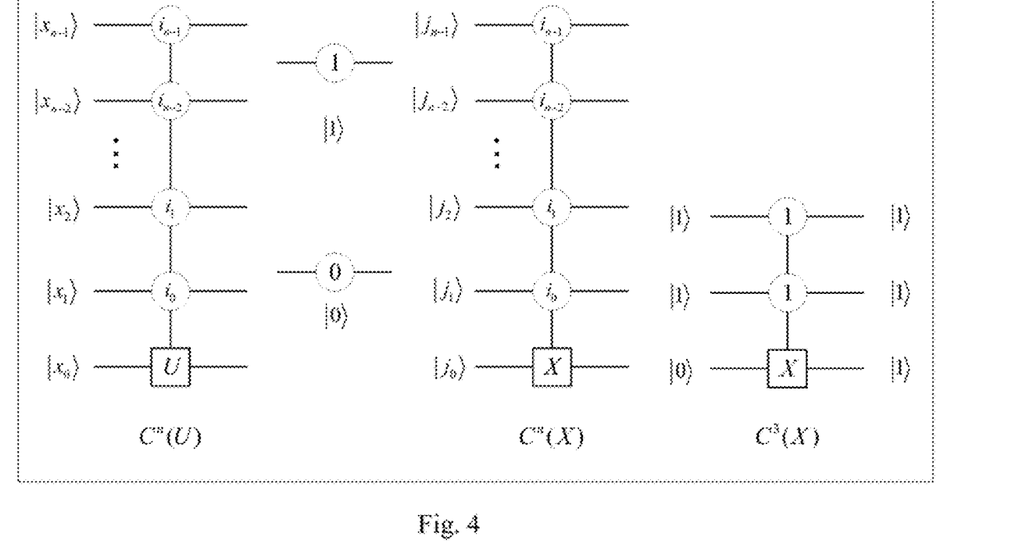
FIG. 4 is a multi-qubit Controlled-U gate and a multi-qubit Controlled-X gate in the prior art.

Letting U be a random 2×2 unitary matrix, then the n (n≥2)⁻ qubit controlled gate is named as $C^n(U)$, where the n qubits include (n−1) control qubits and 1 target qubit; and assuming that the binary numbers $i_{n-1}, i_{n-2}, \ldots, i_1$ are digits on (n−1) number of control bits, then the symbol representations of $C^n(U)$ are shown in FIG. 4.

By applying the $C^n(U)$ gate to the quantum states $|x_{n-1}x_{n-2} \ldots x_0\rangle$ of n number of single qubits, it is derived:

$$C^n(U)(|x_{n-1}x_{n-2}\ldots x_1x_0\rangle) = |x_{n-1}x_{n-2}\ldots x_1\rangle$$
$$U^{f(x_{n-1}x_{n-2}\ldots x_1, i_{n-1}i_{n-2}\ldots i_1)}|x_0\rangle$$

where if $x_{n-1}x_{n-2} \ldots x_1 = i_{n-1}i_{n-2} \ldots i_1$, then the function $f(x_{n-1}x_{n-2} \ldots x_1, i_{n-1}i_{n-2} \ldots i_1)$ is 1; otherwise, $f(x_{n-1}x_{n-2} \ldots x_1, i_{n-1}i_{n-2} \ldots i_1)$ is 0; and letting $U^0 = I$, $U^\dagger = U$.

When U=X, it is a typical controlled gate, referred to as n-qubit Controlled-NOT gate, simply denoted as $C^n(X)$, as shown in FIG. 4. By applying the $C^n(X)$ gate to the quantum states $|j_{n-1}j_{n-2} \ldots j_1j_0\rangle$ of n number of single qubits, it is derived:

$$C^n(X)|j_{n-1}j_{n-2}\ldots j_1j_0\rangle = |j_{n-1}j_{n-2}\ldots j_1\rangle$$
$$X^{f(j_{n-1}j_{n-2}\ldots j_1, i_{n-1}i_{n-2}\ldots i_1)}|j_0\rangle$$

For example, suppose that n=3, $i_2=i_1=1$, applying $C^n(X)$ to the quantum state $|111\rangle$, there derives $C^n(X)|111\rangle = |110\rangle$.

Figure 6A:
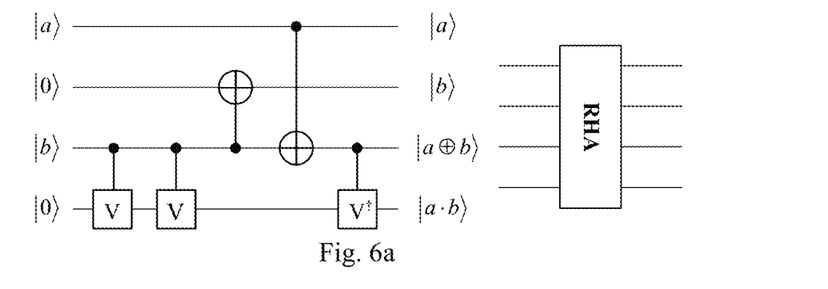
FIG. 6a is a quantum circuit for implementing a quantum half adder and the corresponding simplified module in the prior art.
Figure 6B:
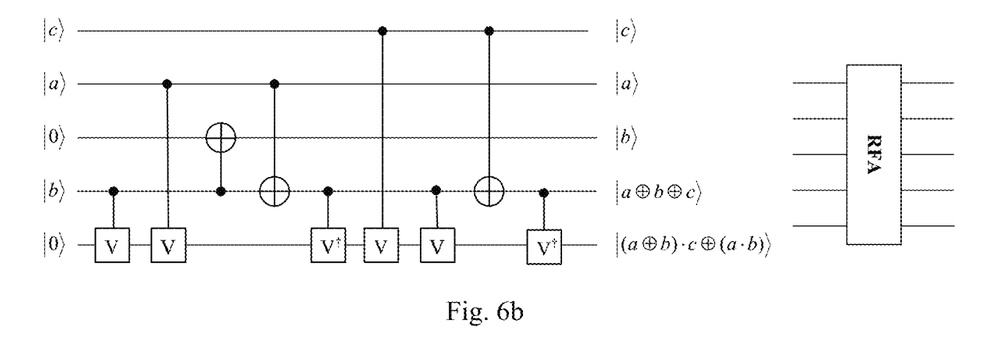
FIG. 6b is a quantum circuit for implementing a quantum full adder and the corresponding simplified module in the prior art.
Figure 8A:
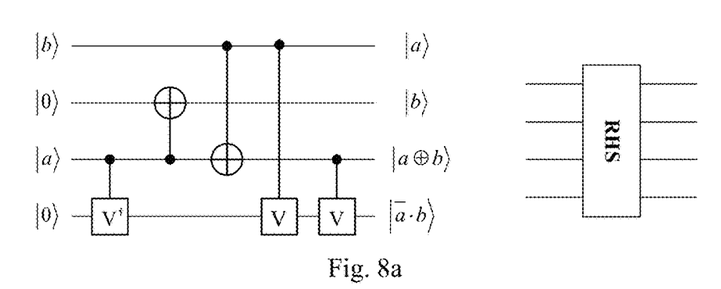
FIG. 8a is a quantum circuit for implementing a quantum half subtractor and the corresponding simplified module in the prior art.
Figure 8B:
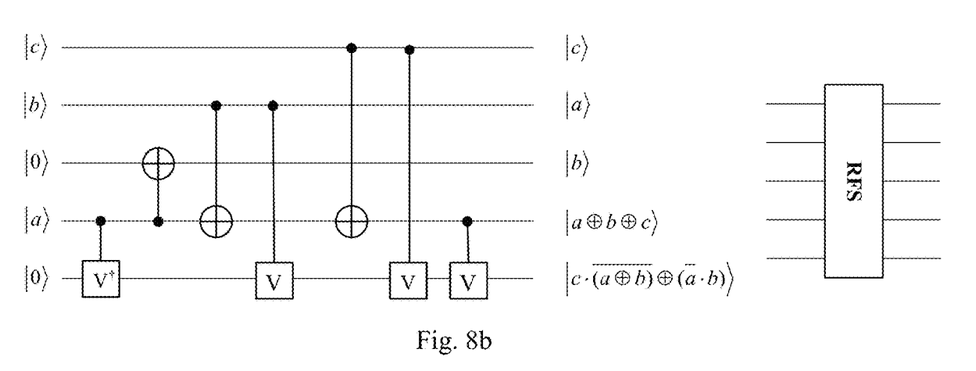
FIG. 8b is a quantum circuit for implementing a quantum full subtractor and the corresponding simplified module in the prior art.
Figure 9:
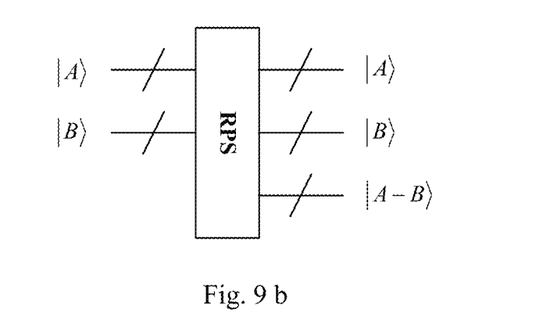
FIG. 9a is a quantum circuit for implementing a parallel subtractor in the prior art.
FIG. 9b is a simplified module of the quantum parallel subtractor circuit in the prior art.

With a series of basic quantum logic gates, a complex quantum arithmetic operation can be constructed. FIG. 6 shows quantum circuit designs for the reversible half adder (RHA) and reversible full adder (RFA). In FIG. 6a, a⊕b denotes the sum of binary bits a+b, and a·b denotes the carry of a+b. In FIG. 6b, a⊕b⊕c denotes the sum of binary bits a+b+c, and (a⊕b)·c⊕(a·b) denotes the carry of a+b+c. FIG. 7 shows quantum circuit design for the reversible parallel adder based on the RHA and RFA modules. Similarly, FIG. 8 shows quantum circuit designs for the reversible half subtractor (RHS) and reversible full subtractor (RFS). In FIG. 8a, a⊕b denotes the difference between binary bits a−b, and $\bar{a}$·b denotes the borrow of a−b. In FIG. 8b, a⊕b⊕c denotes the difference of binary bits a−b−c, and c·$(\overline{a \oplus b})$⊕ ($\bar{a}$·b) denotes the borrow of a−b−c. FIG. 9 shows quantum circuit design for a parallel subtractor based on the RHS and RFS modules.

It is worth noting that in the representation of quantum circuit, each line represents a quantum line, and the quantum gates are executed from left to right.

A two-dimensional image with size of $2^n \times 2^n$ and pixel grayscale ranging $[0, 2^q-1]$ can be expressed by any quantum superposition state in a $2^{q+2n}$-dimension Hilbert space:

$$|I\rangle = \frac{1}{2^n} \sum_{Y=0}^{2^n-1} \sum_{X=0}^{2^n-1} |f(Y, X)\rangle|YX\rangle \quad (1)$$

where $|f(Y,X)\rangle = |C_{YX}^{q-1} C_{YX}^{q-2} \ldots C_{YX}^1 C_{YX}^0\rangle$ is a q-qubit binary sequence, representing the pixel value at location (Y, X), and $|Y\rangle = |y_{n-1}y_{n-2} \ldots y_1y_0\rangle$ and $|X\rangle = |x_{n-1}x_{n-2} \ldots x_1x_0\rangle$ are binary bit sequences of n-qubits, respectively representing the location information of the image in the vertical and horizontal directions.

Figure 5A:
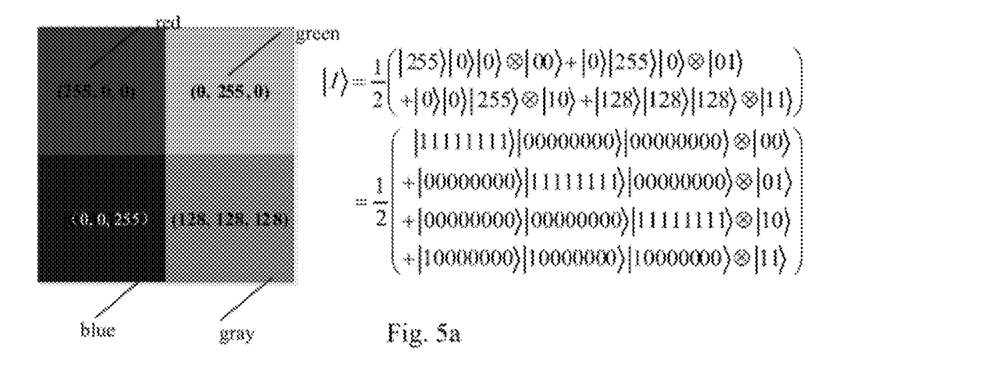
FIG. 5a is a 2×2 quantum color image and its corresponding quantum states in the prior art.
Figure 5B:
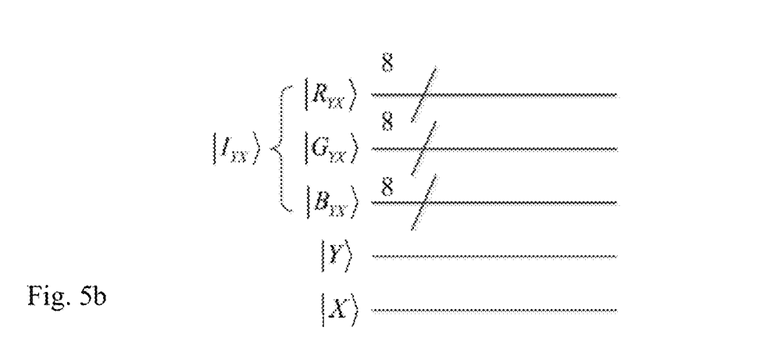
FIG. 5b is the quantum circuit for a 2×2 quantum color image in the prior art.

For example, FIG. 5a-FIG. 5b show a $2^n \times 2^n$ color image, wherein the color information of the image is represented by three channels, i.e., Red (R), Green (G), and Blue (B), the grayscale of each channel being represented by 8 qubits, the grayscale ranging between [0, 255], and the vertical coordinates and the horizontal coordinates being represented by 1 qubit, respectively. Thus, the 2×2 color image can be represented by any quantum superposition state in a $2^{8+8+8+1+1} = 2^{26}$-dimension Hilbert space, wherein the number of qubits is 26.

Accordingly, by sufficiently leveraging the unique advantages of quantum computing such as quantum superposition and quantum parallelism, a corresponding quantum circuit can be designed to realize a quantum color image steganography method for embedding secrete data based on modification direction embedding (MDE).

SUMMARY

The present disclosure is to provide a quantum color image encrypting method based on modification direction embedding and the design of corresponding quantum circuit; the quantum circuit design is to build a corresponding modular circuit specific for quantum computing based on basic qubit gates (including qubits controlled gate and single-qubit gate), the modular circuits including such quantum circuit modules as comparator, parallel adder, parallel subtractor, cyclic shift add 1, and cyclic shift subtract 1; besides, the present disclosure provides a complete quantum color image steganographic circuit design based on the designed basic quantum circuit modules.

To achieve the above and other objects, the present disclosure is implemented through the following technical solutions:

A quantum color image encrypting method based on modification direction embedding comprises:
  selecting a corresponding pixel group for embedding secrete data based on the quantum state of a quantum key information bit;
  computing the first extract function for the pixel group;
  determining that the coordinate position of a carrier image is equal to the coordinate position of a secret data image;
  comparing whether the value of the secret data is equal to the value of the first extract function: in the case of yes, no change made for the pixel group in the carrier image; if no, modifying the pixels in the pixel group in the carrier image to obtain a modified pixel group;
  and computing the second extract function for the modified pixel group.

Preferably, the selecting a corresponding pixel group for embedding secrete data based on the quantum state of a quantum key information bit specifically comprises:
  using the pixels in two channels of R, G, B channels of the carrier image as a pixel group $[|g_{YX}^1\rangle, |g_{YX}^2\rangle]$, then:

$$[|g_{YX}^1\rangle, |g_{YX}^2\rangle] = \begin{cases} [|R_{YX}\rangle, |G_{YX}\rangle], & \text{if } |w_{yx}^0\rangle = |0\rangle \\ [|R_{YX}\rangle, |B_{YX}\rangle], & \text{if } |w_{yx}^0\rangle = |1\rangle \end{cases};$$

where $|R_{YX}\rangle$, $|G_{YX}\rangle$, $|B_{YX}\rangle$ respectively denote the pixel values corresponding to the three channels of the carrier image at position (Y, X); $|w_{yx}^0\rangle$ is quantum state of quantum key information at position (Y, X).

Preferably, the first extract function for the pixel group comprises:
  letting the first extract function $F_{YX}$ be:

$$F_{YX} = F(g_{YX}^1, g_{YX}^2) = (g_{YX}^1 + g_{YX}^2 \times 2) \bmod 4.$$

Preferably, the comparing whether the value of secret data is equal to the value of the first extract function comprises:
  comparing the value of the first extract function $F_{YX}$ and the value of the secrete data $D_{YX}$, and computing the difference $S_{YX}$ accordingly, then:

$$S_{YX} = \begin{cases} D_{YX} - F_{YX}, & \text{if } D_{YX} > F_{YX} \\ F_{YX} - D_{YX}, & \text{if } D_{YX} < F_{YX} \end{cases}$$

where $D_{YX} = w_{yx}^1 w_{yx}^2$, $D_{YX} \in \{0, 1, 2, 3\}$; $w_{yx}^1$ and $w_{yx}^2$ represent the bits of the secret data, at position (Y, X);
if $D_{YX} = F_{YX}$, no modification made for the pixel group $[|g_{YX}^1\rangle, |g_{YX}^2\rangle]$ in the carrier image;
if $D_{YX} > F_{YX}$, further compare the size of the numerical value between $S_{YX}$ and 2, and define the modification to the pixel group $[|g_{YX}^1\rangle, |g_{YX}^2\rangle]$ as:

```
if D_YX > F_YX
  S_YX = D_YX - F_YX;
  if S_YX ≤ 2
    g_YX^{S_YX} = g_YX^{S_YX} + 1;
  else
    g_YX^{4-S_YX} = g_YX^{4-S_YX} - 1;
  end
end;
``` if $D_{YX} < F_{YX}$, define modification to the pixel group $[|g_{YX}^1\rangle, |g_{YX}^2\rangle]$

```
if D_YX < F_YX
  S_YX = F_YX - D_YX;
  if S_YX ≤ 2
    g_YX^{S_YX} = g_YX^{S_YX} - 1;
  else
    g_YX^{4-S_YX} = g_YX^{4-S_YX} + 1;
  end
end
```

Preferably, the second extract function for the modified pixel group comprises:
  assume that the pixel group in carrier image embedded with the secret data based on modification direction changes from $[g_{YX}^1, g_{YX}^2]$ to $[e_{YX}^1, e_{YX}^2]$, directly computing the value of the second extract function of the modified pixel group $[e_{YX}^1, e_{YX}^2]$ so as to extract the secret data, then:

$$E_{YX} = w_{yx}^1 w_{yx}^2 = E(e_{YX}^1, e_{YX}^2) = (e_{YX}^1 + e_{YX}^2 \times 2) \bmod 4 =$$
$$\left(E_{YX}^0 E_{YX}^1 \ldots E_{YX}^{q-1} E_{YX}^q E_{YX}^{q+1}\right) \bmod 4 = E_{YX}^q E_{YX}^{q+1}.$$

The present disclosure further provides a quantum color image encrypting circuit based on the based on modification direction embedding method, comprising:
  a quantum parallel adder utilized for computing the value of the first extract function or the value of a second extraction function;
  a quantum comparator module utilized for comparing whether the coordinate position of the secret data carrier image is equal to the coordinate position of the secret data image and comparing whether the size of the secret data is equal to the value of the extract function;
  a quantum parallel subtractor utilized for computing a difference between the secrete data and the extract function;
  performing a corresponding add 1 or subtract 1 operation on the pixels in pixel group in the carrier image based on the difference using a cyclic shift add 1 or a cyclic shift subtract 1 quantum circuit modules.

Compared with the prior art, the present disclosure offers the following advantages: first, in the present disclosure, quantum modular circuits such as a parallel adder, a parallel subtractor, a comparator, a cyclic shift add 1, and a cyclic shift subtract 1 are built based on basic qubit gates including a controlled qubit gate and a single-qubit gate, and then a circuit for implementing quantum color image steganography is designed. From the analysis of the circuit complexity implementing the color image steganography, it is seen that for a two-dimensional color image with $2^{2n}$ pixels, the pixel values in three channels R, G, and B of which are represented by q qubits, the steganography algorithm is an efficient transformation method, wherein the complexity $O(q^2 + n)$ of resulting quantum circuit cannot be achieved by other classical geometric transformations. The present disclosure is suitable for many practical image processing applications, e.g., transmitting a secrete data by virtue of public images. All of such applications require an effective and secure steganography algorithm. Besides, the present disclosure is significant in perfection and application of quantum image processing theories.

DETAILED DESCRIPTION OF EMBODIMENTS

To make the objects, technical solutions, and advantages of the embodiments of the present disclosure much clearer, the technical solutions in the embodiments of the present disclosure will be described clearly and completely with reference to the accompanying drawings of the embodiments of the present disclosure.

Figure 12:
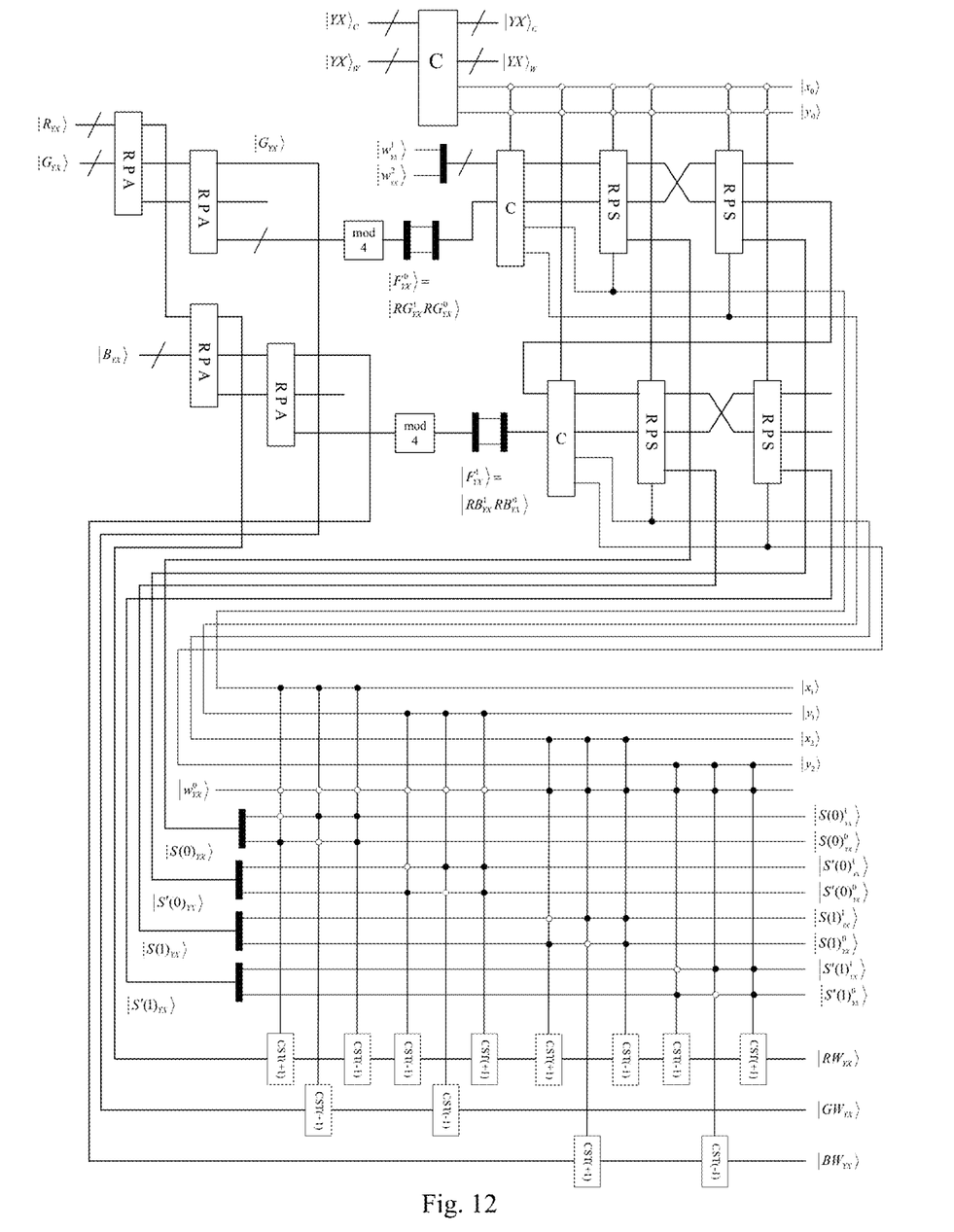
FIG. 12 is the quantum circuit for implementing quantum secret data embedding.
Figure 13:
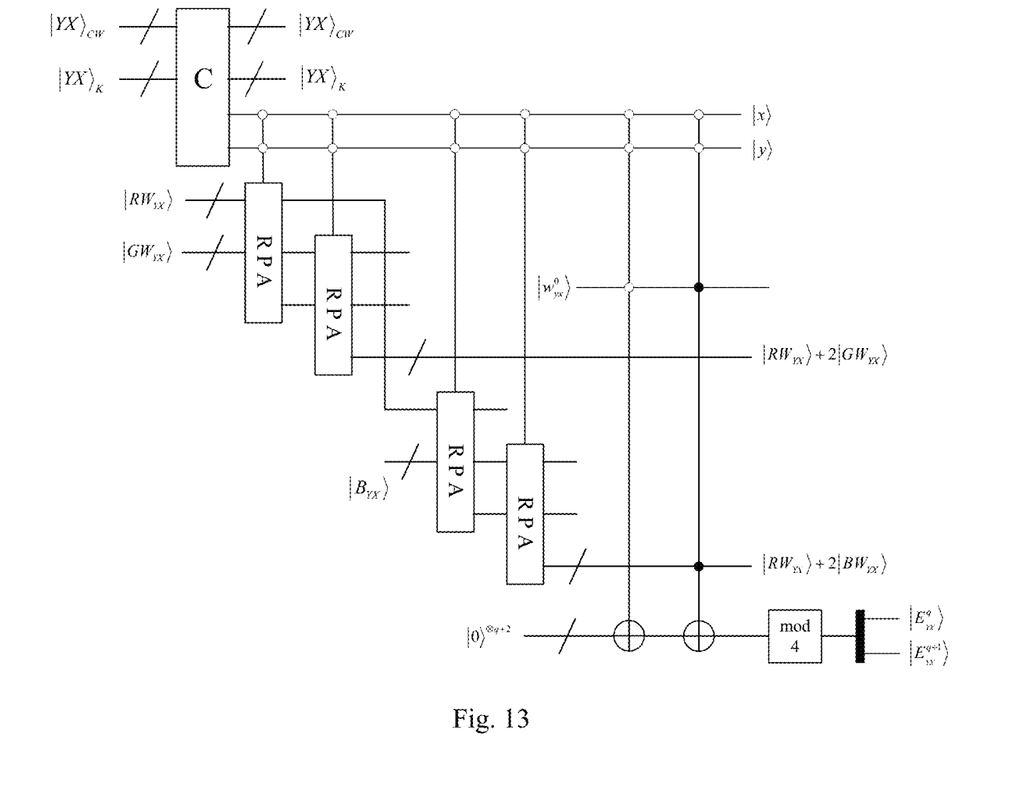
FIG. 13 is the quantum circuit for implementing quantum secret data extracting.

As shown in FIGS. 12-13, the quantum color image encrypting method based on modification direction combines the techniques of quantum computation and digital image processing realizing quantum color image steganography.

The quantum color image encrypting method is to embed secret data based on modification information, wherein the carrier image is a color image represented by R, G, and B channels; the secret data includes two binary images represented; and the control key is a binary image represented by a parity check bit sequence generated according two secret binary images.

The circuit complexity of the quantum color image steganography is $O(q^2+n)$, where $2^n \times 2^n$ is the size of the carrier image, the size of the secret data image, and the size of the key image, q denotes the number of qubits used by each of the R, G, and B channels; a classical color carrier image needs to be processed before being stored in a quantum state as follows: for the grayscale $D_{YX}$ (D=R, G, B) of each of the R, G, and B channels of the color image, if $D_{YX}=255$, then $D_{YX}=D_{YX}-1=254$; if $D_{YX}=0$, then $D_{YX}=D_{YX}+1=1$; and then, storing the changed color carrier image as the quantum state:

$$|I\rangle = \frac{1}{2^n}\sum_{Y=0}^{2^n-1}\sum_{X=0}^{2^n-1}|C_{YX}\rangle|YX\rangle = \frac{1}{2^n}\sum_{Y=0}^{2^n-1}\sum_{X=0}^{2^n-1}|R_{YX}\rangle|G_{YX}\rangle|B_{YX}\rangle|YX\rangle;$$

where $|C_{YX}\rangle = |R_{YX}\rangle|G_{YX}\rangle|B_{YX}\rangle$, denoting color information at the position (Y, X) in the carrier image; $R_{YX}=R_{YX}^0 R_{YX}^1 \ldots R_{YX}^{q-1}$, $G_{YX}=G_{YX}^0 G_{YX}^1 \ldots G_{YX}^{q-1}$, and $B_{YX}=B_{YX}^0 B_{YX}^1 \ldots B_{YX}^{q-1}$ denote the grayscales of the channels R, G, and B of the carrier image; $Y=y_{n-1} \ldots y_1 y_0$ and $X=x_{n-1} \ldots x_1 x_0$ denote the spatial coordinate information at the vertical position and the horizontal position of the carrier image, respectively.

A quantum image with 3-qubit pixels formed by two binary secret data images (secrete data) and one binary key image (key data) is expressed as:

$$|W\rangle = \frac{1}{2^n}\sum_{Y=0}^{2^n-1}\sum_{X=0}^{2^n-1}|W_{YX}\rangle|YX\rangle, W_{YX} = w_{YX}^0 w_{YX}^1 w_{YX}^2, w_{YX}^j \in \{0,1\}$$

where and $w_{yx}^1$ and $w_{yx}^2$ respectively denote the bits of secret data; and $w_{yx}^0 = w_{yx}^1 \oplus w_{yx}^2$ denotes the key bit for parity check.

The quantum color image encrypting method based on modification direction embedding according to the present disclosure specifically comprises:

Step S1: selecting a corresponding pixel group for embedding secrete data based on the quantum state of a quantum key information bit, i.e., if $w_{YX}^0=0$, selecting the pixels of $\{R_{YX}, G_{YX}\}$ channels of the quantum color carrier image as the pixel group; if $w_{YX}^1=1$, selecting pixels of $\{R_{YX}, B_{YX}\}$ channels of the quantum color carrier image as the pixel group.

Therefore, in the case of using pixels of two of the R, G, B channels of the quantum color carrier image as the pixel group $[|g_{YX}^1\rangle, |g_{YX}^2\rangle]$, then:

$$[\,|g_{YX}^1\rangle,\,|g_{YX}^2\rangle] = \begin{cases} [\,|R_{YX}\rangle,\,|G_{YX}\rangle], & \text{if } |w_{yx}^0\rangle = |0\rangle \\ [\,|R_{YX}\rangle,\,|B_{YX}\rangle], & \text{if } |w_{yx}^0\rangle = |1\rangle \end{cases};$$

where $|R_{YX}\rangle$, $|G_{YX}\rangle$, $|B_{YX}\rangle$ denote the pixel values corresponding to the three channels of the color carrier image at position (Y, X); $|w_{yx}^0\rangle$ is the bit value of the key image at position (Y, X).

Step S2: supposing $|w_{yx}^1 w_{yx}^2\rangle$ is the secret bit information of the secret data image at position (Y, X), modification to the pixel group $[g_{YX}^1\rangle,|g_{YX}^2\rangle]$ in the carrier image is described as:

computing the first extract function $F_{YX}$ for the pixel group, i.e., $$F_{YX}=F(g_{YX}^1,g_{YX}^2)=(g_{YX}^1+g_{YX}^2\times 2)\bmod 4;$$

where the subscript "YX" denotes the corresponding position (Y, X) in the image, and the superscript (1, 2) denotes a bit sequence in the pixel group.

Step D3: embedding the secrete data, mapping each secrete data $D_{YX}$ to the pixel group $\{g_{YX}^1,g_{YX}^2\}$ in the carrier image, comparing the value of the function $F_{YX}$ and the size of the secret data $D_{YX}=w_{yx}^1 w_{yx}^2 \in \{0,1, 2, 3\}$ and computing the corresponding difference, which is defined as:

$$S_{YX} = \begin{cases} D_{YX} - F_{YX}, & \text{if } D_{YX} > F_{YX} \\ F_{YX} - D_{YX}, & \text{if } D_{YX} < F_{YX} \end{cases}$$

The embedding algorithm for the secret data is described below:

if $D_{YX}=F_{YX}$, no modification made for the pixel group $[|g_{YX}^1\rangle,\,-g_{YX}^2\rangle]$ of the carrier image;

if $D_{YX}\ne F_{YX}$, further compare the values of $S_{YX}$ and 2, and define the modification to the pixel group $[|g_{YX}^1\rangle,|g_{YX}^2\rangle]$ as:

```
if D_YX > F_YX
    S_YX = D_YX - F_YX;
    if S_YX ≤ 2
        g_YX^SYX = g_YX^SYX +1;
    else
        g_YX^{4-SYX} = g_YX^{4-SYX} -1;
    end
end
``` similarly, if $D_{YX}<F_{YX}$, defining modification to the pixels in pixel group $[g_{YX}^1\rangle,|g_{YX}^2\rangle]$ as:

```
if D_YX < F_YX
    S_YX = F_YX - D_YX;
    if S_YX ≤ 2
        g_YX^SYX = g_YX^SYX -1;
    else
        g_YX^{4-SYX} = g_YX^{4-SYX} +1;
    end
end.
```

Step S4, suppose that the pixel group of the carrier image after being embedded with the secret data based on the modification direction changes from $[g_{YX}^1,g_{YX}^2]$ to $[e_{YX}^1,e_{YX}^2]$, directly computing the value of second extract function for the modified pixel group $[e_{YX}^1, e_{YX}^2]$ to extract the secret data, defined as:

$$E_{YX} = w_{yx}^1 w_{yx}^2 = E(e_{YX}^1, e_{YX}^2) = (e_{YX}^1 + e_{YX}^2 \times 2)\bmod 4 = $$
$$(E_{YX}^0 E_{YX}^1 \ldots E_{YX}^{q-1} E_{YX}^q E_{YX}^{q+1})\bmod 4 = E_{YX}^q E_{YX}^{q+1}.$$

where the subscript "YX" denotes the corresponding position (Y, X) in the image, and the superscript (1, 2) in $[e_{YX}^1,e_{YX}^2]$ denotes the order of pixels in pixel group; and the superscript (0, 1, . . . , q, q+1) denotes the order of bits in the bit sequence $E_{YX}^0 E_{YX}^1 \ldots E_{YX}^{q-1} E_{YX}^q E_{YX}^{q+1}$.

Figure 7A:
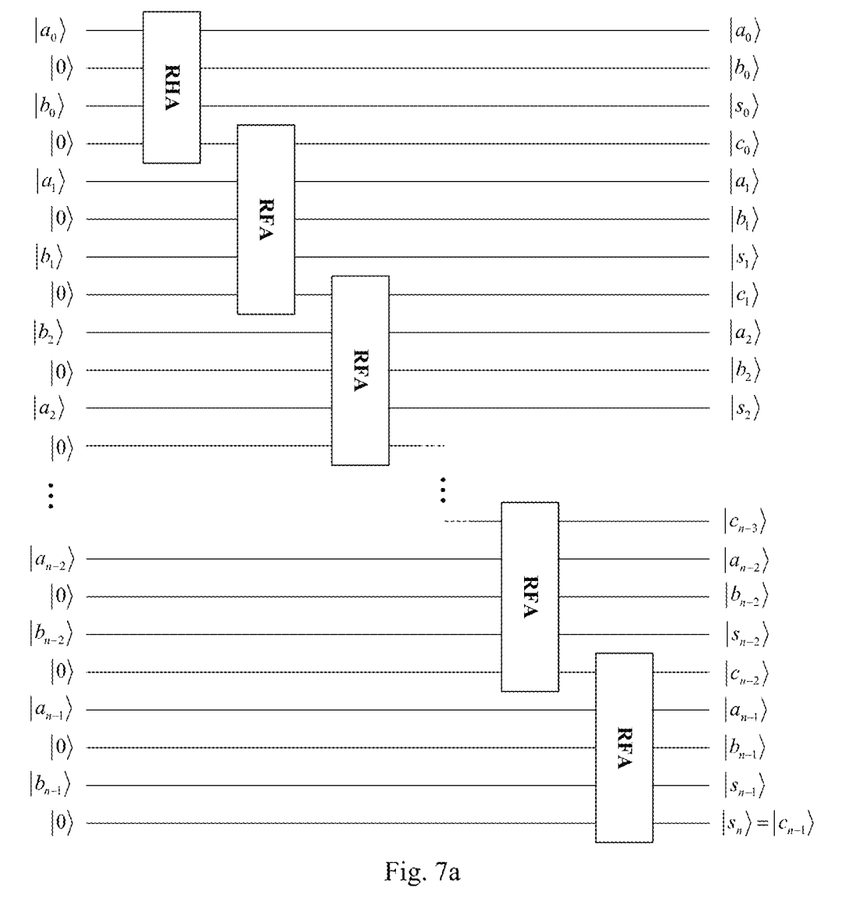
FIG. 7a is a quantum circuit for implementing a quantum parallel adder in the prior art.
Figure 7B:
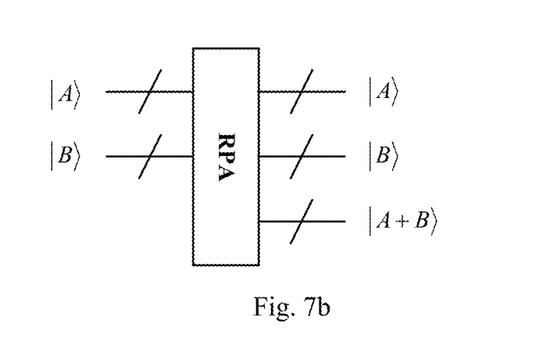
FIG. 7b is a simplified module corresponding to the quantum parallel adder circuit in the prior art.

As shown in FIG. 12, the quantum color image encrypting circuit based on modification direction according to the present disclosure comprises: a quantum parallel adder RPA, a quantum comparator module C, a quantum parallel subtractor RPS, a cyclic shift add 1 quantum modular circuit, and a cyclic shift subtract 1 quantum modular circuit. The quantum circuit design according to the present disclosure is mainly implemented in following steps that sequentially perform corresponding computing:

Compute the sum of pixels in pixel group by the quantum parallel adder RPA modules (as shown in FIG. 7a-FIG. 7b, the quantum adder module is configured for computing the value of first extract function for the pre-modification pixel group and the value of second extract function for the post-modification pixel group), and then computes the extract function $F_{YX}$ via mod 4 operation, namely:

$$RPA(g_{YX}^2,RPA(g_{YX}^1,g_{YX}^2))=(g_{YX}^2,g_{YX}^1+g_{YX}^2,g_{YX}^1+g_{YX}^2\times 2)$$

$$F_{YX}=(g_{YX}^1+g_{YX}^2\times 2)\bmod 4$$

Figure 10A:
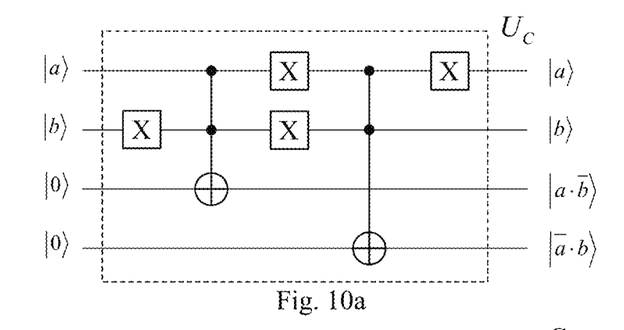
FIG. 10a is a single qubit quantum comparator circuit in the present disclosure.
Figure 10B:
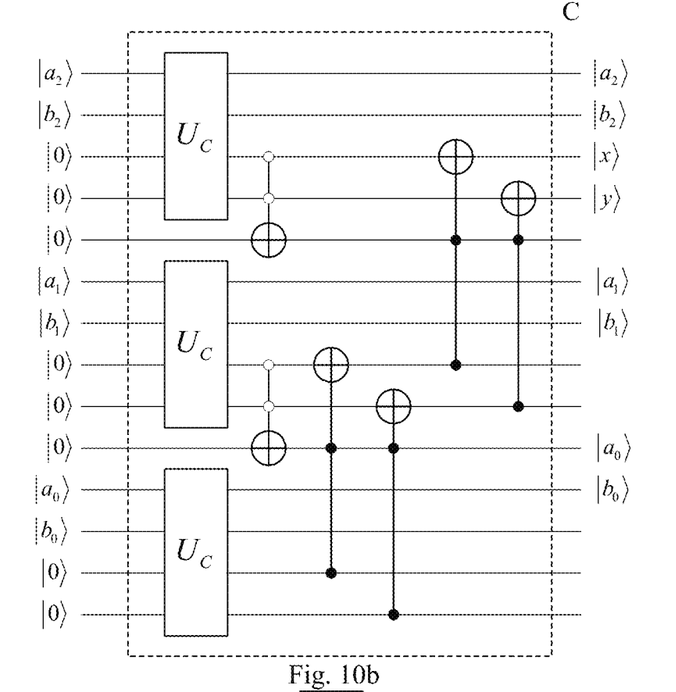
FIG. 10b is a n-qubit quantum comparator circuit in the present disclosure.
Figure 10C:
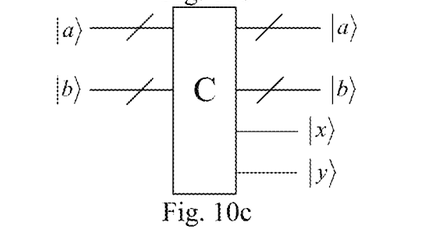
FIG. 10c is the simplified module of a quantum comparator circuit for achieving multiple qubits in the present disclosure.

(2) As quantum images are stored in quantum superposition state, under the precondition of guaranteeing exact correspondence between the coordinate positions of two quantum images, it is needed to perform a parallel processing operation on the information in the two quantum images stored in the superposition state, thereby embedding the quantum secrete data into the quantum carrier image so as to further perform the following operation: comparing, by the quantum comparator C (i.e., the conventional quantum comparator in the prior art, as shown in FIGS. 10c-10c), whether the coordinate position of the secrete data carrier image is equal to the coordinate position of the secrete data image;

$$C(YX_C,YX_W)=(YX_C,YX_W,x,y)$$

when x=y=0, it indicates that the coordinate positions in the two images are equal; when x=1 (the digit 1 indicates quantum state |x> in computational basis state |1>), it indicates that $YX_C>YX_W$; when y=1, it indicates $YX_C<YX_W$. If the position of the secrete data carrier image is equal to the position of the secrete data image, the subsequent corresponding computation is performed; if the positions of the two images are not equal, the subsequent corresponding computation is not performed.

(3) comparing, by the comparator C, whether the size of the secrete data $D_{YX}$ is equal to the value of the first extract function $F_{YX}$, namely:

$$C(F_{YX},D_{YX})=(F_{YX},D_{YX},x,y)$$

when x=y=0, it indicates $F_{YX}=D_{YX}$; when x=1, it indicates $F_{YX}>D_{YX}$; if y=1, it indicates $F_{YX}<D_{YX}$.

Figure 9A:
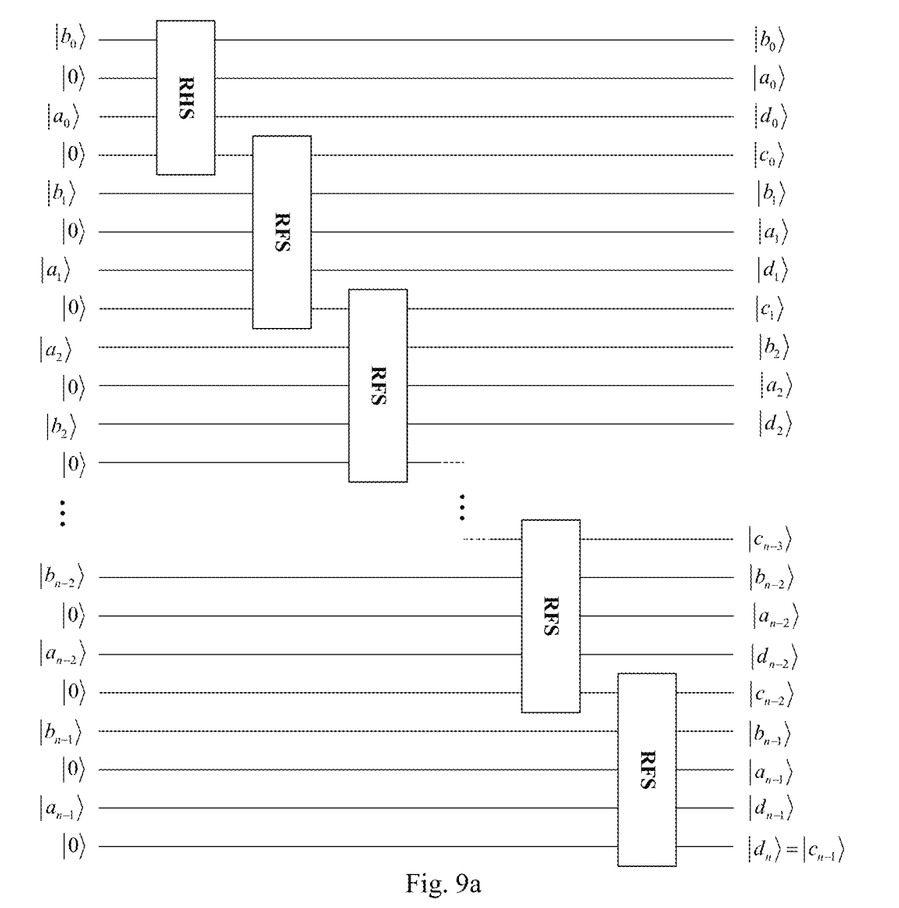

(4) Based on the size relationship between $D_{YX}$ and $F_{YX}$, computing, by the quantum parallel subtractor RPS (as shown in FIGS. 9a-9b), the difference between $F_{YX}$ and $D_{YX}$, namely:

$$RPS(D_{YX}, F_{YX}) = (D_{YX}, F_{YX}, D_{YX} - F_{YX}),$$

if $D_{YX} > F_{YX}$ $$RPS(F_{YX}, D_{YX}) = (F_{YX}, D_{YX}, F_{YX} - D_{YX}),$$

if $D_{YX} < F_{YX}$.

$$S_{YX} = \begin{cases} D_{YX} - F_{YX} & \text{if } D_{YX} > F_{YX} \\ F_{YX} - D_{YX} & \text{if } D_{YX} < F_{YX} \end{cases}$$

Figure 11A:
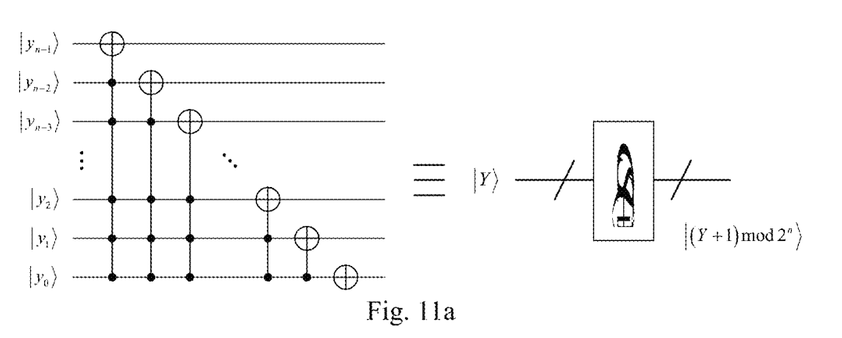
FIG. 11a is the quantum circuit for a quantum cyclic shift add 1 and corresponding simplified circuit module in the present disclosure.
Figure 11B:
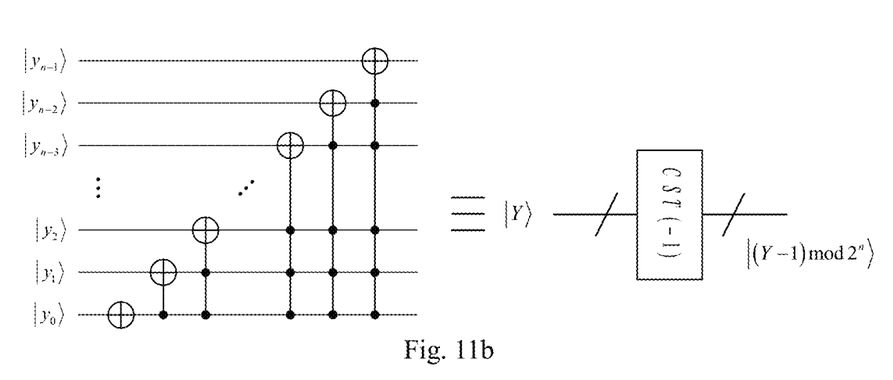
FIG. 11b is the quantum circuit for a quantum cyclic shift subtract 1 and
corresponding simplified circuit module in the present disclosure.

(5) performing a corresponding add 1 or subtract 1 operation on the pixels in pixel group of carrier image based on the difference, specifically comprising: performing a corresponding change to the pixel group in the carrier image based on $F_{YX}$, $D_{YX}$, and the difference $S_{YX}$, i.e., by changing or not changing the pixels in the pixel group in the carrier image using the cyclic shift add 1 quantum modular circuit (CST(+1)) or the cyclic shift subtract 1 quantum modular circuit (CST(-1)) (e.g., the conventional modular circuit in the prior art as shown in FIGS. 11a-11b), the steganography pixel group with the embedded secrete data can be obtained.

The quantum circuit complexity defined in the present disclosure refers to the number of single-qubit gates and two-qubit gates for building the quantum circuit. The quantum gate $C^n(U)$ may comprise $O(n)$ number of single-qubit gates and the Controlled-NOT gates shown in FIG. 3; then, the complexity of the q-qubit quantum cyclic shift add 1 or subtract 1 circuit is calculated to be $O(q^2)$ (as shown in FIGS. 11a-11b); hence, the complexity of the quantum circuit for the designed quantum color image steganography algorithm is $O(q^2+n)$.

In view of the above, the present disclosure combines quantum computing with modification direction embedding algorithm in classical digital image processing, and exploits a color image as the carrier image and the binary images respectively as the secrete data and the control key to implement a quantum image steganography algorithm. The present disclosure is applicable for many practical image processing applications, e.g., transmitting a secrete data via a public image, where an effective and secure steganography algorithm is needed. Besides, the present disclosure is significant in perfection and application of quantum image processing theories.

Although the contents of the present disclosure have been described through the foregoing preferred embodiments in detail, it should be understood that the depictions above shall not be regarded as limitations to the present disclosure. After those skilled in the art having read the contents above, many modifications and substitutions to the present disclosure are all obvious. Therefore, the protection scope of the present disclosure should be limited by the appended claims.

We claim:

1. A quantum color image encrypting method based on modification direction comprises:
   selecting a corresponding pixel group for embedding secret data based on a quantum state of a quantum key information bit;
   computing a first extract function of a pixel group;
   determine that a coordinate position of a carrier image is equal to a coordinate position of a secret data image;
   comparing whether a value of the secret data is equal to a value of the first extract function: if yes, no modification is made to the pixels in the pixel group in the carrier image; if no, modifying pixels in the pixel group in the carrier image, and then obtaining the modified pixel group;
   and computing a second extract function of the modified pixel group.

2. The quantum color image encrypting method based on modification direction according to claim 1, wherein:
   the selecting a corresponding pixel group for embedding secret data based on the quantum state of a quantum key information bit specifically comprises:
   using the pixels in two channels of R, G, B channels of the carrier image as a pixel group $[|g_{YX}^1\rangle, |g_{YX}^2\rangle]$, then:

$$[|g_{YX}^1\rangle, |g_{YX}^2\rangle] = \begin{cases} [|R_{YX}\rangle, |G_{YX}\rangle], & \text{if } |w_{yx}^0\rangle = |0\rangle \\ [|R_{YX}\rangle, |B_{YX}\rangle], & \text{if } |w_{yx}^0\rangle = |1\rangle \end{cases};$$

where $|R_{YX}\rangle$, $|G_{YX}\rangle$, $|B_{YX}\rangle$ respectively denote the pixel values corresponding to the three channels of the carrier image at position (Y, X); $|w_{yx}^0\rangle$ is the bit value of the key image at position (Y, X).

3. The quantum color image encrypting method based on modification direction according to claim 2, wherein:
   the computing the first extract function for the pixel group comprises:
   letting the first extract function $F_{YX}$ be:

$$F_{YX} = F(g_{YX}^1, g_{YX}^2) = (g_{YX}^1 + g_{YX}^2 \times 2) \bmod 4.$$

4. The quantum color image encrypting method based on modification direction according to claim 3, wherein:
   the comparing whether the value of secret data is equal to the value of the first extract function comprises:
   comparing the value of the first extract function $F_{XY}$ and the value of the secrete data $D_{YX}$, and computing the difference $S_{YX}$ therebetween, then:

$$S_{YX} = \begin{cases} D_{YX} - F_{YX}, & \text{if } D_{YX} > F_{YX} \\ F_{YX} - D_{YX}, & \text{if } D_{YX} < F_{YX} \end{cases}$$

where $D_{YX} = w_{yx}^1 w_{yx}^2$, $D_{YX} \in \{0, 1, 2, 3\}$; $w_{yx}^1$ and $w_{yx}^2$), represent the bits of the secret data in position (Y, X), respectively;

if $D_{YX} = F_{YX}$, no modification made to pixel group $[|g_{YX}^1\rangle, |g_{YX}^2\rangle]$ in the carrier image;

if $D_{YX} > F_{YX}$, further comparing between the difference $S_{YX}$ and 2, and defining the modification to the pixel group $[|g_{YX}^1\rangle, |g_{XY}^2\rangle]$ as:

```
if D_YX > F_YX
   S_YX = D_YX - F_YX;
   if S_YX ≤ 2
      g_YX^S_YX = g_YX^S_YX + 1;
   else
      g_YX^{4-S_YX} = g_YX^{4-S_YX} - 1;
   end
end
``` if $D_{YX} < F_{YX}$, defining modification to the pixel group $[|g_{YX}^1\rangle, |g_{YX}^2\rangle]$ as:

```
if D_YX < F_YX
    S_YX = F_YX - D_YX;
    if S_YX ≤ 2
        g_YX^{S_YX} = g_YX^{S_YX} −1;
    else
        g_YX^{4−S_YX} = g_YX^{4−S_YX} +1;
    end
end.
```

5. The quantum color image encrypting method based on modification direction according to claim 2, wherein:
   the computing the second extract function for the modified pixel group comprises:
   assuming that the pixel group of carrier image embedded with the secret data based on modification direction changes from $[g_{YX}^1, g_{YX}^2]$ to $[e_{YX}^1, e_{YX}^2]$, directly computing the value of the second extract function of the modified pixel group $[e_{YX}^1, e_{YX}^2]$ so as to extract the secret data, then:

$$E_{YX} = w_{yx}^1 w_{yx}^2 = E(e_{YX}^1, e_{YX}^2) = (e_{YX}^1 + e_{YX}^2 \times 2) \bmod 4 =$$
$$(E_{YX}^0 E_{YX}^1 \ldots E_{YX}^{q-1} E_{YX}^q E_{YX}^{q+1}) \bmod 4 = E_{YX}^q E_{YX}^{q+1}.$$

6. A quantum color image encrypting circuit based on the quantum color image encrypting method that is based on modification direction according to claim 1, comprising:
   a quantum parallel adder,
   the quantum parallel adder performing steps of computing the value of the first extract function and the value of the second extraction function;
   a quantum comparator module determining whether the coordinate position of the carrier image is equal to the coordinate position of the secret data image, and comparing whether a size of the secret data is equal to the value of the first extract function;
   a quantum parallel subtractor configured for computing a difference between the secret data and the first extract function;
   a cyclic shift add 1 quantum modular circuit performing a corresponding add 1 operation on the pixel group in the carrier image based on the difference; and
   a cyclic shift subtract 1 quantum modular circuit performing a corresponding subtract 1 operation based on the difference.

7. The quantum color image encrypting circuit based on the quantum color image encrypting method that is based on modification direction according to claim 6, comprising:
   a quantum parallel adder,
   the quantum parallel adder performing steps of computing the value of the first extract function and computing the value of the second extraction function;
   a quantum comparator module determining whether the coordinate position of the carrier image is equal to the coordinate position of the secret data image, and comparing whether a size of the secret data is equal to the value of the first extract function;
   a quantum parallel subtractor configured for computing a difference between the secrete data and the first extract function;
   a cyclic shift add 1 quantum modular circuit performing a corresponding add 1 operation on the pixel group in the carrier image based on the difference; and
   a cyclic shift subtract 1 quantum modular circuit performing a corresponding subtract 1 operation based on the difference.

8. The quantum color image encrypting circuit based on the quantum color image encrypting method that is based on modification direction according to claim 7, comprising:
   a quantum parallel adder;
   the quantum parallel adder performing steps of computing the value of the first extract function and computing the value of the second extraction function;
   a quantum comparator module determining whether the coordinate position of the carrier image is equal to the coordinate position of the secret data image, and comparing whether a size of the secret data is equal to the value of the first extract function;
   a quantum parallel subtractor configured for computing a difference between the secrete data and the first extract function;
   a cyclic shift add 1 quantum modular circuit performing a corresponding add 1 operation on the pixel group in the carrier image based on the difference; and
   a cyclic shift subtract 1 quantum modular circuit performing a corresponding subtract 1 operation based on the difference.

9. The quantum color image encrypting circuit based on the quantum color image encrypting method that is based on modification direction according to claim 8, comprising:
   a quantum parallel adder,
   the quantum parallel adder performing steps of computing the value of the first extract function and computing the value of the second extraction function;
   a quantum comparator module determining whether the coordinate position of the carrier image is equal to the coordinate position of the secret data image, and comparing whether a size of the secret data is equal to the value of the first extract function;
   a quantum parallel subtractor configured for computing a difference between the secrete data and the first extract function;
   a cyclic shift add 1 quantum modular circuit performing a corresponding add 1 operation on the pixel group in the carrier image based on the difference; and
   a cyclic shift subtract 1 quantum modular circuit performing a corresponding subtract 1 operation based on the difference.

10. The quantum color image encrypting circuit based on the quantum color image encrypting method that is based on modification direction according to claim 9, comprising:
    a quantum parallel adder,
    the quantum parallel adder performing steps of computing the value of the first extract function and computing the value of the second extraction function;
    a quantum comparator module determining whether the coordinate position of the carrier image is equal to the coordinate position of the secret data image, and comparing whether a size of the secret data is equal to the value of the first extract function;
    a quantum parallel subtractor configured for computing a difference between the secrete data and the first extract function;
    a cyclic shift add 1 quantum modular circuit performing a corresponding add 1 operation on the pixel group in the carrier image based on the difference; and
    a cyclic shift subtract 1 quantum modular circuit performing a corresponding subtract 1 operation on the pixel group in the carrier image based on the difference.

* * * * *